Oct. 22, 1929.  G. P. WHITE  1,732,321
PRESSURE PROCESSING APPARATUS
Original Filed Aug. 27, 1925
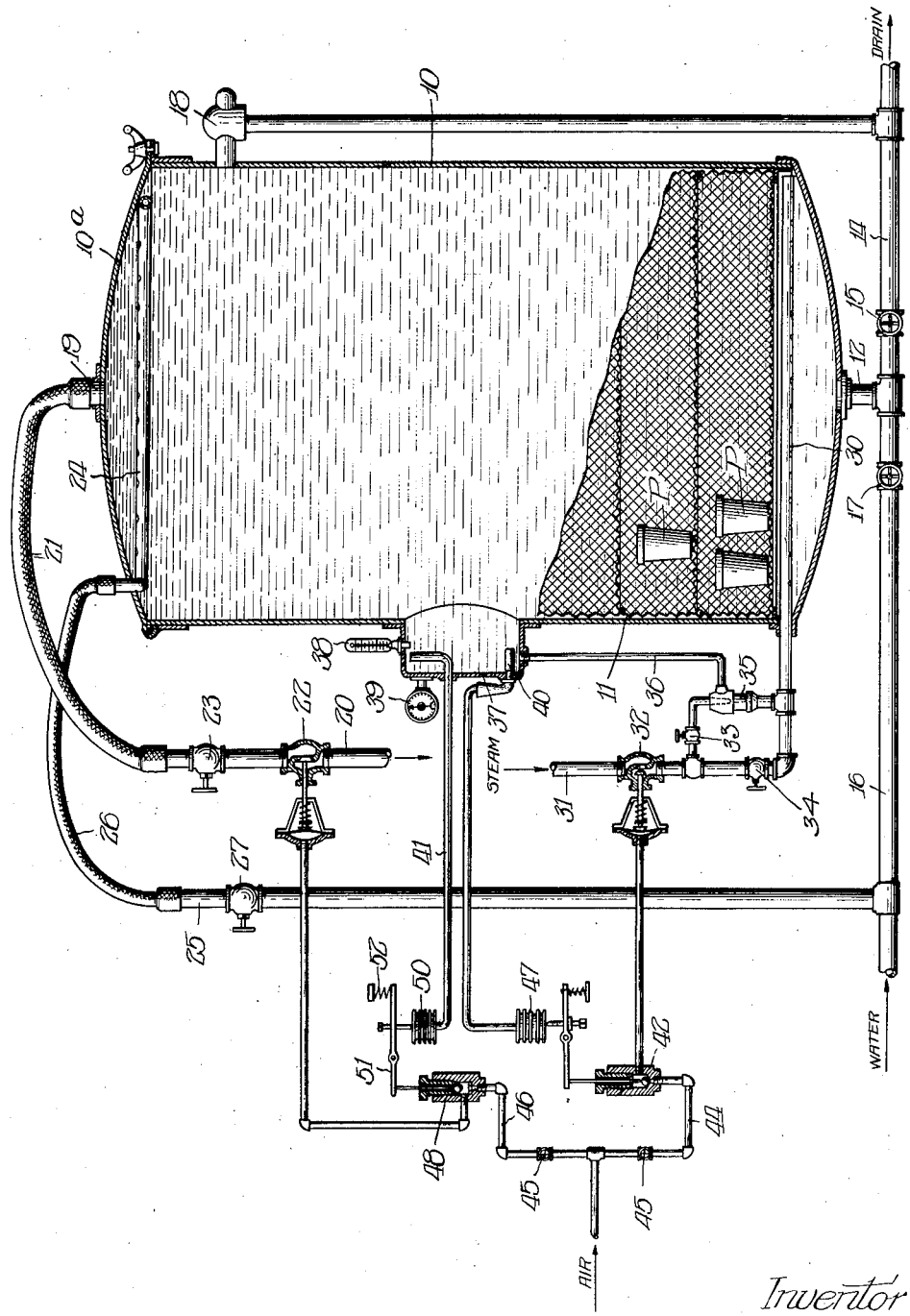
Witness:
R. Burkhardt
Inventor:
George P. White,
By Cromwell, Leitz......
Attys.

Patented Oct. 22, 1929

1,732,321

UNITED STATES PATENT OFFICE

GEORGE P. WHITE, OF CHICAGO, ILLINOIS, ASSIGNOR TO WHITE CAP COMPANY, OF CHICAGO, ILLINOIS, A CORPORATION OF DELAWARE

PRESSURE PROCESSING APPARATUS

Original application filed August 27, 1925, Serial No. 52,950. Divided and this application filed August 23, 1926. Serial No. 130,939.

This invention relates generally to preserving, and particularly to improvements in apparatus for the cooking, sterilizing or preserving of perishable products in marketable packages. The present application is a division of my co-pending application on Pressure processing, Serial No. 52,950, filed August 27, 1925.

The general purpose of the invention is the provision of an improved apparatus which will be productive of high efficiency in the pressure processing of commodities, such efficiency resulting both from the simplicity of the apparatus, economy in its operation and elimination of loss of goods treated, as well as from the high quality of product obtainable.

More specifically, the objects of the invention include:

The provision of apparatus which may be regulated or controlled either by direct supervision or automatically;

Apparatus which will accomplish thorough and uniform treatment of all the packages submitted to treatment in a batch;

Apparatus which greatly simplifies maintenance of the requisite external pressure on the packages during both the heating and cooling treatments, and eliminates the possibility of sudden pressure fluctuations resulting from changes in temperature;

Apparatus which practically eliminates the possibility of the breaking of glass containers by sudden or extreme changes in temperature during either the heating or cooling operations;

Apparatus in which the pressure and heating factors are susceptible of separate and independent control;

Apparatus which makes for expedition in the treatment of a batch; and

Apparatus which is practically free from hazard to the installation itself or to individuals occupied in operating it.

Other and further objects of the invention will be pointed out or indicated hereinafter, or will be obvious to one skilled in the art upon an understanding of it or its employment in practice.

In the accompanying drawing forming a part of this specification I illustrate diagrammatically one arrangement of apparatus by which the invention may be embodied, but it is to be understood that the claims are not to be construed as limited simply to the construction shown. In said drawing, the figure is a diagrammatic representation of a sectional elevation of a process retort or autoclave together with its various connections and control apparatus.

Various considerations are of great importance in the pressure processing of commodities in packages. As the packages are subjected to the pressure processing in batches, it is of fundamental importance that all of the packages be subjected to a requisite degree and period of heating to accomplish the desired cooking or sterilizing. Furthermore, in view of the fact that the degree of heat usually requisite for the processing is sufficiently high to generate pressures within the packages which, unless counteracted, would result in the distortion or opening of the packages, and the consequent fouling of their contents or destruction of their merchantability, it is important that such internal pressures of the packages be effectively and reliably counteracted by the application of external pressures, during both the heating and the cooling of the packages, and that such external pressures be subjected to accurate control at all times in order that either the opening or the distorting of packages or containers may be prevented. Moreover, for economical and profitable operation it is of importance that the time requisite for the processing of a batch of packages be as short as possible, consonant with proper treatment of the material. The present invention provides apparatus by which these important results are attained in a very simple manner without waste of materials.

The nature of this invention may be ascertained from the illustrative apparatus shown in the drawing, wherein the reference numeral 10 designates a retort or autoclave having the removable cover 10ª and adapted to accommodate the introduction and removal of crates or trays 11 which form supports and convenient handling containers for the packages which are to be treated. The cover is adapted to make a substantial water tight closure for the retort and to be secured in closed position. The retort is to be made of any suitable material of the strength necessary to sustain the operating pressures, and preferably having a substantial degree of elasticity, comparable to boiler plate. At the bottom of the retort is a connection 12 having communication with the drain 14, under control of valve 15, and having communication with the water line 16 under control of the valve 17. Water is supplied to line 16 under a pressure superior to the pressure contemplated in the carrying on of the process. A safety valve 18 is provided for relieving the retort of pressure in excess of some established maximum. At the top of the retort is the relief connection 19, communicating with the relief pipe 20 by a flexible connection 21 arranged to permit the swinging of the cover 10ª. These provide a path of communication with the retort which is controlled by the automatic relief valve 22 and hand valve 23. On the cover is carried the distributing spray or coil 24 having distributed outlets preferably directed upwardly, which spray is supplied from the water line 16 through the water admission pipe 25 and flexible connection 26. Water admission pipe 25 is controlled by admission valve 27. In the bottom of the retort is a steam inlet pipe 30, preferably provided with distributing orifices directed downwardly. This is supplied with steam from the steam supply pipe 31 at a pressure in excess of that contemplated for employment within the retort. Admission of steam to the steam inlet pipe 30 is controlled by steam admission valves 32 and 34. In a by-pass from the steam supply pipe, controlled by valve 33, is the injector 35 arranged to induce movement of liquid through a circulation pipe 36 leading from the instrument pocket 37 which is attached to and has open communication with the retort. Communicating with the interior of this pocket are the various detecting devices, including the thermometer 38, the pressure indicator 39, the thermostat device 40 and the pressure tube 41. The expansive element 47 of the thermostat device is rendered effective upon a pilot valve 42 which controls the compressed air line 44 in which a constant air pressure is maintained from a suitable compressor. When this pressure is impressed on the diaphragm of valve 32, it will be effective to close the valve against the influence of its spring, all in the well known fashion in which such valves operate. When the heat to which the thermostat device 40 is subjected within the retort reaches a predetermined degree, the thermostat device will open the valve 42 and permit valve 32 to be closed by the air pressure admitted from line 44, thus cutting off the supply of steam to the retort. Relief valve 22 is likewise arranged to be closed by pressure from air line 46, said air line being controlled by pilot valve 48. The pressure within the retort is transmitted through the pressure tube 41 to a motive device 50 which is effective, on expansion, to swing the lever 51 against the influence of its spring 52. When the pressure within the retort reaches a predetermined maximum, lever 51 will be moved by the motive device 50 to close pilot valve 48 and vent the diaphragm chamber of relief valve 22, which will permit said valve to be opened by its spring, and relieve pressure from the retort through lines 21 and 20. Valves 22 and 32 may be cut out by closing air line valves 45, which leaves valves 22 and 23 held open by their springs.

In the operation of the apparatus, the crates, filled with the hermetically closed packages, are charged into the retort, steam valve 34 and water valve 17 being closed. Water is then admitted from line 16 by opening valve 17, and steam is admitted from line 31 by opening valve 34, until the retort is practically filled with water, the water being heated to a certain extent by the steam incident to the filling of the chamber. The cover is then closed down and secured in closed position, valve 23 being opened when desired to permit the venting of the remaining air from the retort. The admission of steam is continued, with the effect of gradually but rapidly raising the temperature of the water. The automatic control now may be cut in by opening valves 45, which has the effect of closing automatic valve 22. As the temperature of the water, now confined within the retort, continues to rise incident to the continued admission of steam, it tends to expand against the constraint of the retort, thus generating a pressure which is effective upon the contained packages to prevent their becoming distorted or uncapped by the pressures developed within them by the heat to which they are subjected. This heat, of course, is imparted to them from the water in which they are immersed, and is of the degree desirable or requisite for the cooking or sterilizing of the packaged material. Practice has demonstrated that, in order to prevent distortion or uncapping of the packages by internal pressure, it is necessary to apply to them an external pressure which is in excess of the pressure of saturated steam at the temperature employed for the sterilizing or cooking. Such pressure is obtained in the use of my invention by constraining the expansion tendency of the water as it is heated, whereby I am able to generate pressures amply in excess of the pressure of saturated steam at the same temperature. In the automatic operation of the apparatus the operating temperature is predetermined by the setting of the thermostat device which, so long as the temperature remains at the desired point, will hold the valve 32 closed, but permit the same to open when the temperature of the water in the retort falls below that desired. In the same fashion the operating pressure in the retort is held at the desired degree by the automatic operation of valve 22, which remains closed so long as the pressure does not exceed the desired maximum, and opens automatically to relieve excess pressure as it is developed. Valve 23 may be adjusted to throttle down the flow capacity of line 20, so that automatic valve 22 may exercise a very close control and avoid over-correction. In this fashion both temperature and pressure are maintained practically constant throughout the processing period. Once the desired pressure is obtained, there is but little possibility of its falling below the requisite minimum, as it is impossible for a sudden and extreme drop in the temperature of the confined water to occur. At the end of the cooking or sterelizing period the steam supply is completely cut off by the closing of valve 34, and cold water is admitted to the distributor 24 by the opening of valve 27. This water, which is supplied at a pressure in excess of that maintained in the retort, is distributed through the volume of the hot water in the upper part of the retort, and tends to settle until its temperature is equalized with the water about it. In this fashion the temperature of the entire body of water within the retort is gradually reduced, to cool the packages to a point where it is safe to relieve them of the external pressure. Incident to this cooling operation the external pressure is maintained on the packages as before, by the automatic regulating effect of valve 22, which permits the water displaced by the entering cooling water to find exit through the outlet 19 and relief pipe 20. When the packages have been cooled to the requisite degree, enough water is drawn off by the opening of drain valve 15 to permit the opening of the retort without its overflowing. The retort being then opened, the crates are withdrawn and replaced by others containing a batch of unprocessed packages. These are lowered into the water remaining in the retort, and the process repeated in the manner described above.

The operation of the apparatus is not dependent on automatic regulation. By observation of the temperature indicator 38 and the pressure indicator 39, temperature of the water in the retort may be regulated and maintained at the desired degree by hand operation of valve 34 as the occasion demands, and the retort pressure likewise may be controlled by hand operation of the valve 23.

A highly advantageous feature of the present invention resides in its freedom from the possibility of sudden and radical drop in pressure due to a drop in temperature. In this respect it possesses a very marked distinction from apparatus wherein steam or heated air or mixtures of the two are depended on to maintain the pressure. In such apparatus an inadvertent admission of cooling water, or other causes, may result in a very sudden cooling of the steam and air in the retort producing a sudden and radical drop in pressure which is likely to result in the uncapping of some or all of the packages. This is impossible in the use of my invention as the hot water is not susceptible to a sudden cooling or the contraction in volume such as steam or heated air. A further great advantage resides in the elimination of possible injury to glass vessels and the like at the start of the cooling operation, as with my invention the heated packages are not exposed to the danger of breakage by being subjected suddenly to contact with cold water. Nevertheless, the cooling operation is accomplished quickly, because the reduction in temperature is continuous, without requiring any time for preliminary cooling of the retort, or any preliminary tempering of the cooling water. Advantages are gained similarly in the cooking or sterilizing. Upon the application of heat, the temperature is raised rapidly but gradually, so that the packages are not subjected to a sudden scalding. This is of advantage not only as a safeguard against fracturing glass containers, but also tends to improve the quality and appearance of the product, as it gives an opportunity for the heat to be transmitted and distributed to the material in the package, thus preventing the portion in direct contact with the vessel being subjected to excessive heating. A particular advantage resides in the assured uniformity of cooking of the entire charge. This may be understood particularly in comparison with apparatus in which mixtures of heated air and steam are used. Not only is advantage gained because of the much better heat conductivity of the water, but the convection is much better, and such incidents as cool areas and air pockets, which are more or less prevalent where compressed air is used, are avoided. A very substantial conservation of heat is possible, due to the retention in the retort of the partially heated water after the processing of a batch.

All of these various features contribute not only to certainty in the carrying out of the process, and the elimination of loss from injury to packages, but also greatly expedite the proceeding, and thereby increase the efficiency of operation. Further advantages reside in the simplicity of the apparatus and the procedure, as it is not necessary to provide for equalization of water pressure with the steam pressure or to maintain uniformity of either. The only prerequisites as to the service line conditions are that the steam pressure and the water pressure be suitably in excess of the maximum pressure which it is desired to maintain in the retort, so that either steam or water may be introduced into the retort against the retort pressure whenever occasion demands. Although practical uniformity of temperature is maintained throughout the body of water in the retort, the circulation induced by the injector 35 through the pipe 36 and the pocket 37, wherein are disposed the bulbs of the heat responsive devices, constitutes an added precaution for keeping those devices truly indicative of the retort temperature. Advantage is gained by disposal of the relief outlet 19 at the crown of the retort, as in such location it accommodates the venting of air and steam from the retort, thereby avoiding the pocketing of a volume of air or steam adequate to influence the effective retort pressure by changes in temperature.

I claim:

1. Apparatus for the heating and cooling of packages under pressure, comprising, in combination, an autoclave adapted to be filled to the top with water, means for heating water in the autoclave, means for supporting packages in the autoclave, a cooling water distributor near the top of the autoclave, a discharge connection at the top of the autoclave, and means for selectively regulating discharge of fluid from the autoclave through said discharge connection.

2. Apparatus for heating and cooling packages under pressure, comprising, in combination, an autoclave adapted to be filled to the top with a body of liquid, means for supporting packages in the body of liquid, means at the bottom of the autoclave for the introduction of heat into the body of liquid, means in the upper portion of the autoclave for introducing cooling water into the body of liquid, a discharge connection for outlet of liquid from the autoclave above the last mentioned means, and means for regulating discharge of liquid from the autoclave through the outlet connection.

3. Apparatus for heating and cooling packages under pressure, comprising, in combination, an autoclave adapted to be filled with liquid, means for heating liquid in the autoclave, means for the introduction of cooling liquid into the upper portion of the body of liquid within the autoclave, a discharge connection at the top of the autoclave for outlet of liquid therefrom, and means selectively adjustable in response to pressure in the autoclave for regulating discharge of liquid through said connection.

4. Apparatus for the pressure processing of packages, comprising, in combination, an autoclave adapted to confine under pressure a body of liquid completely filling same, means for injecting steam into the body of liquid, means for injecting cooling water into the body of liquid at the top thereof, an outlet connection at the top of the autoclave for the venting of fluid therefrom and adjustable means for controlling the venting of fluid through the outlet connection, whereby the pressure within the autoclave may be controlled.

5. Apparatus for the pressure processing of packages, comprising, in combination, an autoclave, heating means for heating a body of liquid in the autoclave, means for introducing cooling liquid into the autoclave, a temperature responsive device for controlling the heating means and means for inducing a circulation of liquid in the autoclave in contact with the temperature responsive device.

6. Apparatus for the pressure processing of packages, comprising, in combination, an autoclave having a top closure, means for supporting packages in the autoclave, means for introducing water at the bottom of the autoclave, means for introducing heat at the bottom of the autoclave, a discharge connection at the top of the autoclave above all the package supporting means, means for regulating discharge of fluid therethrough, and a cooling water distributor in the autoclave above the package supporting means and below the discharge connection.

7. Apparatus for the pressure processing of packages, comprising, in combination, an autoclave having a laterally communicating pocket, a temperature responsive device located within the pocket, heat supplying means under control of the temperature responsive device, and means for inducing circulation of liquid from the autoclave through the pocket.

8. In apparatus for pressure processing, the combination of an autoclave having a top charging opening, a pocket communicating laterally with the autoclave, a temperature responsive device located within the pocket, means for heating fluid in the autoclave, and connections between the autoclave and pocket for accommodating circulation of fluid from one to the other.

9. In an apparatus for pressure processing, the combination with an autoclave having an instrument pocket in open communication therewith, of a conduit forming an external circulating path between said pocket and the autoclave, and a device arranged to supply heating fluid to the autoclave and induce circulation of fluid from the autoclave through said conduit.

In testimony whereof I have hereunto subscribed my name.

GEORGE P. WHITE.